US006997105B2

(12) United States Patent
Dannenhauer et al.

(10) Patent No.: US 6,997,105 B2
(45) Date of Patent: Feb. 14, 2006

(54) SEPARATION DEVICE FOR DOUGH PIECES

(75) Inventors: Bernd Dannenhauer, Dinkelsbühl (DE); Frank Blümel, Mönchsroth (DE); Thomas Schmidt, Martinsheim (DE)

(73) Assignee: Werner & Pfleiderer Lebensmitteltechnik GmbH, Dinkelsbühl (DE)

( * ) Notice: Subject to any disclaimer, the term of this patent is extended or adjusted under 35 U.S.C. 154(b) by 0 days.

(21) Appl. No.: 10/864,864

(22) Filed: Jun. 10, 2004

(65) Prior Publication Data

US 2005/0022677 A1 Feb. 3, 2005

(30) Foreign Application Priority Data

| Jun. 10, 2003 | (DE) | ................................ 103 26 481 |
| Aug. 6, 2003 | (DE) | ................................ 103 36 457 |
| Dec. 15, 2003 | (DE) | ................................ 103 58 540 |

(51) Int. Cl.
*A23L 1/00* (2006.01)

(52) U.S. Cl. .............................. 99/334; 99/352; 99/357; 99/450.1

(58) Field of Classification Search .................. 99/330, 99/331–334, 352–355, 339, 340, 467–476, 99/427, 444–450, 483, 357, 443 R, 443 C, 99/516, 536, 450.1–450.8, 494; 219/400, 219/401; 426/502, 517, 466, 523; 425/364 R, 425/383, 403.1, 398, 400, 397, 434, 412
See application file for complete search history.

(56) References Cited

U.S. PATENT DOCUMENTS

| 4,508,025 A | * | 4/1985 | Schultz ........................ 99/353 |
| 4,528,900 A | * | 7/1985 | Simelunas .................. 99/450.7 |
| 4,936,203 A | * | 6/1990 | Aoki et al. ................. 99/450.1 |
| 5,060,562 A | * | 10/1991 | Florindez ...................... 99/353 |
| 5,158,785 A | * | 10/1992 | Konig .......................... 425/233 |
| RE34,530 E | | 2/1994 | Kirkpatrick |
| 5,375,509 A | * | 12/1994 | Taylor et al. ............... 99/450.6 |
| 5,441,342 A | * | 8/1995 | Konig et al. ............... 366/76.7 |
| 5,486,048 A | * | 1/1996 | Konig .......................... 366/76.8 |
| 5,996,476 A | * | 12/1999 | Schultz ........................ 99/349 |
| 6,065,392 A | * | 5/2000 | Florindez ...................... 99/353 |
| 6,129,010 A | * | 10/2000 | Hurd et al. ................... 99/353 |
| 6,813,992 B1 | * | 11/2004 | Blumel et al. ................ 99/330 |

FOREIGN PATENT DOCUMENTS

| DE | 42 29 242 A1 | 3/1994 |
| DE | 196 33 448 A1 | 2/1998 |

\* cited by examiner

*Primary Examiner*—Timothy F. Simone
(74) *Attorney, Agent, or Firm*—Browdy and Neimark, PLLC

(57) ABSTRACT

A separation device for dough pieces (2) is provided with an inlet portion for delivering a plurality of dough pieces (2), a separation unit (26) for separating the dough pieces (2) delivered and an outlet portion (27) for individually discharging the dough pieces (2) separated from one another. The separation unit (26) comprises a container (28) having a container bottom (31) which is divided into a round inner portion (33) to which the dough pieces (2) are delivered and an outer portion (34), extending at least partially around the inner portion (33). The outer portion (34) can be caused to rotate relative to the inner portion (33) around an axis of rotation extending perpendicular to the container bottom plane and is arranged in conveying connection with the outlet portion (27). Such a separation device reliably separates a plurality of dough pieces.

16 Claims, 17 Drawing Sheets

SEPARATION DEVICE FOR DOUGH PIECES

BACKGROUND OF THE INVENTION

1. Field of the Invention

The present invention relates to a separating device for dough pieces or bakery products provided with
- an inlet portion for delivering a plurality of dough pieces,
- a separation unit for separating the dough pieces delivered,
- an outlet portion for individually discharging the dough pieces separated from one another.

2. Background Art

Such separation devices are known as they are obviously in use at present. Individual items to be baked, especially dough pieces, tend to stick together if they are in contact with one another. In addition, the dough pieces tend to stick to the components used for their conveyance. Although there are many different solutions for separating a plurality of dough pieces, i.e. for conveying a predetermined number of dough pieces in a controlled, sequential manner, the known separating devices have not yet satisfactorily solved the problems related to the aforedescribed stickiness. In consequence, it is not possible to automatically deliver a predetermined number of dough pieces with sufficient reliability, i.e. to deliver exactly the desired number. Certain applications where the aforesaid exactness is crucial can therefore not be automated using the known separating devices. Such an application is e.g. the numerically exact charging of a baking oven which is provided with receptacles for a predetermined number of dough pieces. In other applications, the counting inaccuracies related to the drawbacks of the known separating devices always require a certain excess of dough pieces. If e.g. dough pieces, which can e.g. be deep-frozen or partially frozen (partially defrosted), are to be packed in packing drums containing e.g. 30 dough pieces each, the known separating devices produce packing drums which always contain at least 30, but as a rule 31 to 34 dough pieces. Naturally, the production of such packing drums involves higher costs than are incurred if exactly the required number of dough pieces can be delivered. In addition, such packing drums containing different numbers of dough pieces cannot be used for applications where it is crucial that exactly a predetermined number of dough pieces be delivered by each packing drum.

SUMMARY OF THE INVENTION

It is therefore an object of the present invention to further develop a separation device of the type described at the beginning such that a plurality of dough pieces can be reliably separated.

According to the invention, this object is attained by means of a separating device comprising
- a container having a container bottom which is divided into a round inner portion to which the dough pieces are delivered and an outer portion, particularly an annular one, extending at least partially around the inner portion,
- wherein the outer portion can be caused to rotate relative to the inner portion around an axis of rotation extending pendicular to the container bottom plane and is arranged in conveying connection with the outlet portion.

According to the invention, it has been found that a plurality of dough pieces can be separated in a controlled, reliable manner if the dough pieces are not directly delivered to a conveying portion arranged in conveying connection with the outlet portion, but are first delivered to a separate portion thereof. The plurality of dough pieces delivered can first become distributed on the separate portion, i.e. the inner portion of the container bottom, and subsequently be transported in a controlled manner to the further conveying portion, i.e. the outer portion. In this way, jams in the area of the conveying portion are avoided. This enables an operationally safe and numerically exact separation of dough pieces.

The dough pieces can be transported to the outer portion in a defined manner by means of a drive of the inner portion which can be caused to rotate around the axis of rotation independently of the outer portion and/or a baffle plate which is formed such that dough pieces which are initially positioned on the inner portion are deflected towards the outer portion due to the baffle plate moving relative to the inner portion. The risk that dough pieces to be separated will jam is reduced even further by the fact that the inner portion and the outer portion are provided with independent drives.

The plurality of dough pieces to be separated can be caused to become distributed in a specific manner by means of an inner portion which can be caused to rotate around the axis of rotation in alternating senses of rotation.

A sensor for counting the dough pieces separated from one another permits the throughput of the separation device to be measured, which throughput can then be analyzed in a central control unit in order to control delivery.

The separation device may have an inlet portion being formed by an intermediate bin which is designed such that a partial amount of dough pieces is discharged to the downstream components of the separating device. Such an intermediate bin prevents the separation device from accidentally being charged with too many dough pieces, thus avoiding jams in the separation device from the outset.

The quantity of dough pieces to be discharged from the intermediate bin can be easily predetermined by means of an intermediate bin comprising an outlet whose width is adjustable.

An intermediate bin bottom which is movable around an eccentric axis between at least an open position and a closed position and whose position determines the width of the outlet is easy to manufacture.

A separation device having a separation unit comprising an outer portion which is designed as a conveyor slat belt enables dough pieces separated from one another to be reliably conveyed.

An even more reliable separation of dough pieces is achieved by means of a separation deflector which interacts with at least one separation sensor and, responding to a signal from the separation sensor, transports dough pieces following a first dough piece conveyed on the outer portion from the outer portion back to the inner portion. Dough pieces which are conveyed one after the other on the outer portion are reliably separated from one another even if they stick together.

A sensor which is arranged downstream of the separation deflector in the direction of conveyance of the outer portion and serves to detect dough pieces which are conveyed on at least one of the group of the outer portion and the outlet portion arranged downstream of the separation deflector further increases the reliability of the separation process. The sensor can be used to monitor the separation deflector's function.

The outlet portion may comprise a discharge slide which is allocated to an outlet and conveying compartment of the outer portion arranged downstream of the separation deflector and which discharges dough pieces perpendicular to the direction of conveyance of the outlet and conveying compartment. Such a separation deflector effects a reliable further conveyance of the dough pieces once they have passed the separating device.

A deflecting element for deflecting dough pieces towards the outer portion and/or away therefrom ensures that dough pieces will not accidentally get stuck in the separation device, i.e. that they will essentially remain in the same position within the separation device although the outer portion's drive is working. Such a deflecting element should in particular be arranged in those places in the separation device where the dough pieces are at risk of jamming due to the fact that their conveyance path becomes narrower.

Details of the invention will become apparent from the ensuing description of exemplary embodiments of the invention, taken in conjunction with the drawing, in which:

DESCRIPTION OF A PREFERRED EMBODIMENT

Figure 1:
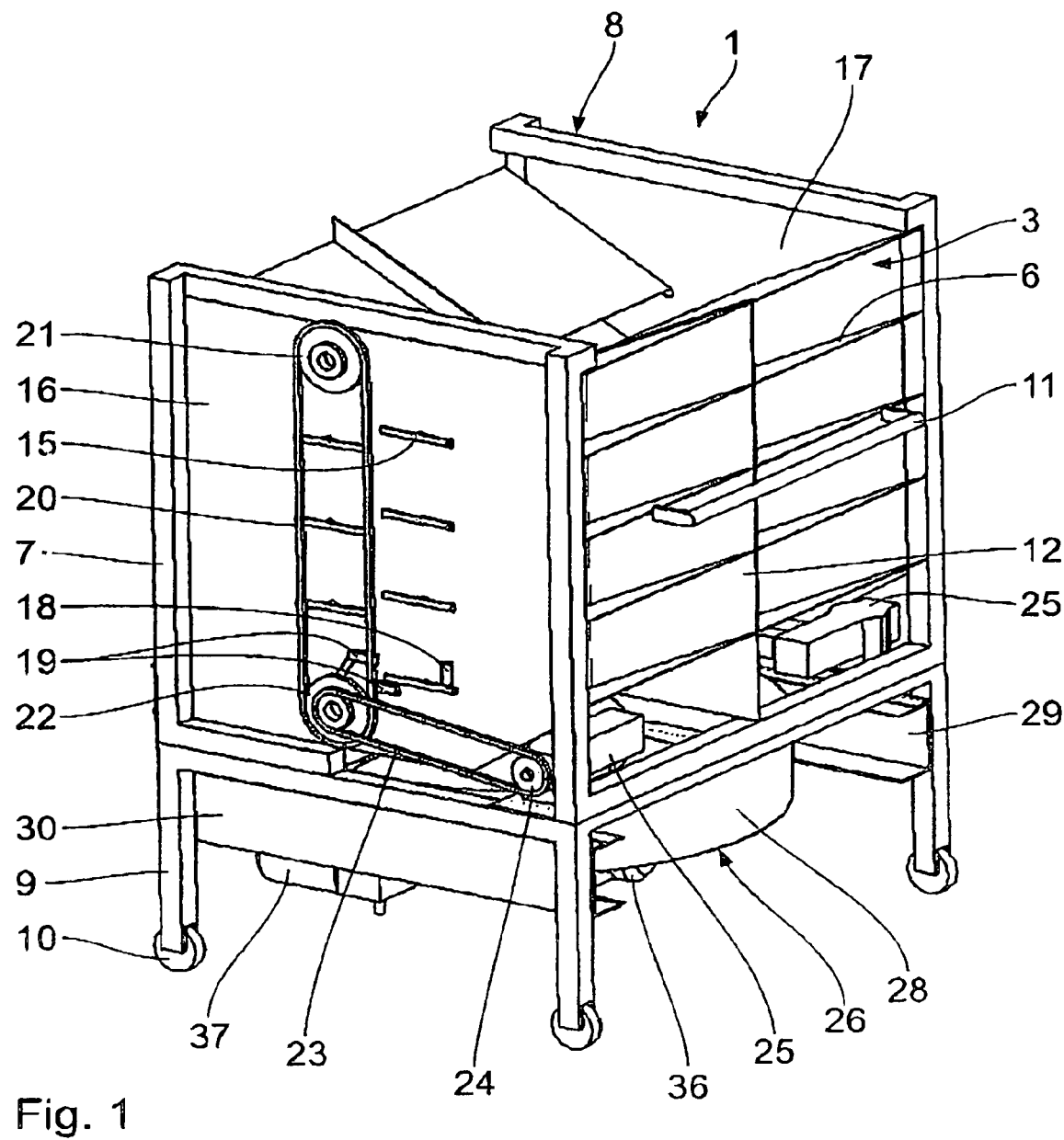
FIG. 1 is a perspective view of a separation device for bakery products.

FIGS. 1 to 7 show a separation device 1 for bakery products or dough pieces 2. The bakery products or dough pieces 2 are for example partially frozen and initially baked rolls. Alternatively, deep frozen initially bakery products, non-frozen initially baked products, deep frozen non-baked bakery products or partly frozen non-baked bakery products or dough pieces 2 may be processed. Of course, handling of baked bakery products also is possible.

The separation device 1 comprises a total of sixteen shelves 3 as a supply bin. Each shelf 3 has a bottom 6 that inclines downwards from an outer inlet portion 4 to an inner outlet portion 5. Each bottom 6 of the shelves 3 is formed as a roller path. Each four of the sixteen shelves 3 are arranged on top of each other. The shelves 3 are supported by a supporting frame 7 of a movable supply transport carriage 8, which has four sustainers 9 each with a caster 10. The transport carriage 8 has a handle 11 of being moved by an operator.

The outlet or transfer portions 5 of eight of the 16 shelves 3 are open towards two opposite front sides of the transport carriage 8. The eight shelves 3, which are allocated to one of these two front sides of the transport carriage 8, are provided in the form of two times four side by side shelves i.e., they are arranged in two side by side groups of four. The side by side shelves 3 have continuous bottoms 6 and are separated by a vertical, continuous central parting wall 12. The shelf area of the separation device 1 is disposed in symmetry to the parting wall 12.

Figure 2:
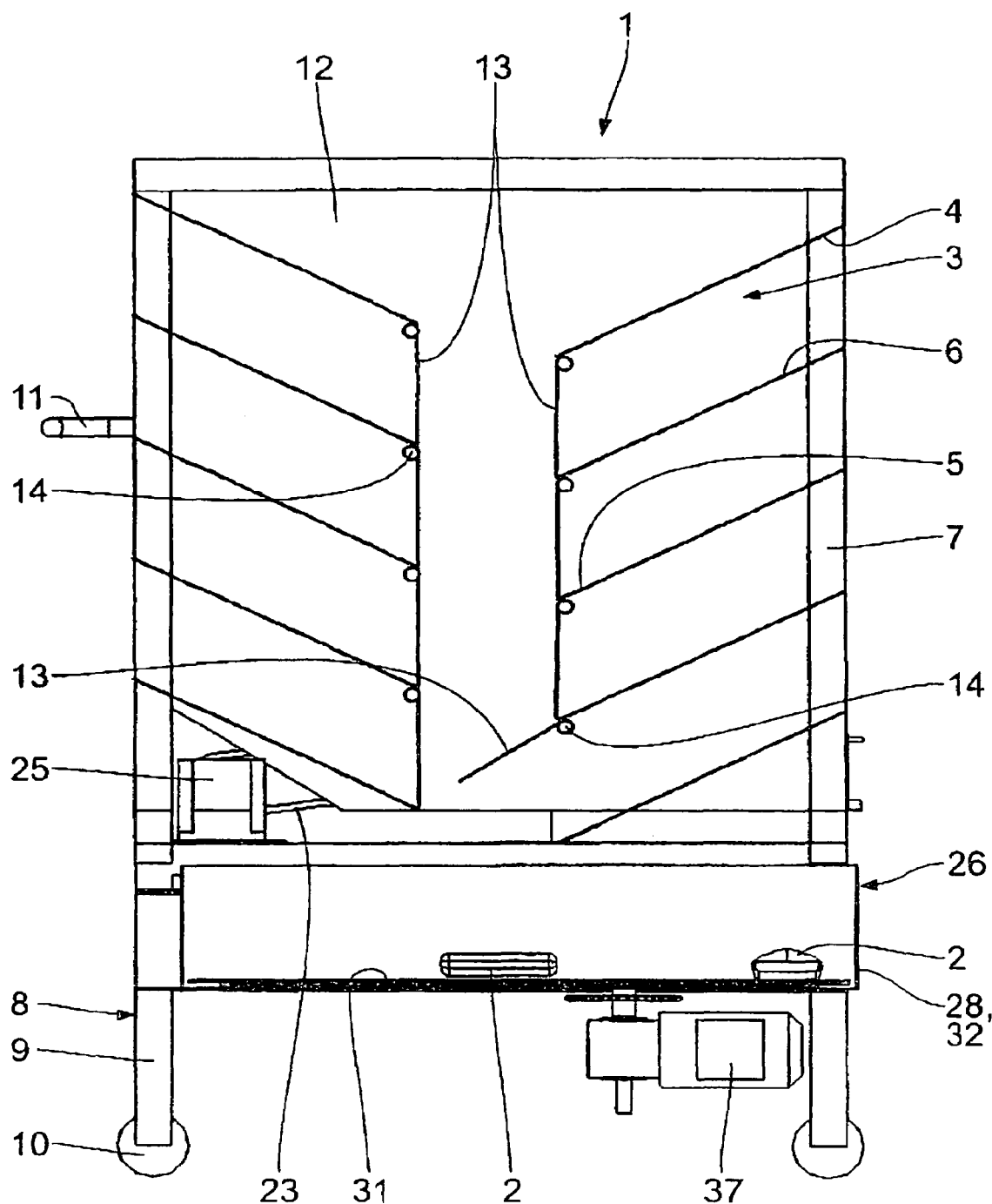
FIG. 2 is a vertical sectional view of the separation device according to FIG. 1 parallel to a center plane of the separation device that is perpendicular to shelves of supply bins.
Figure 3:
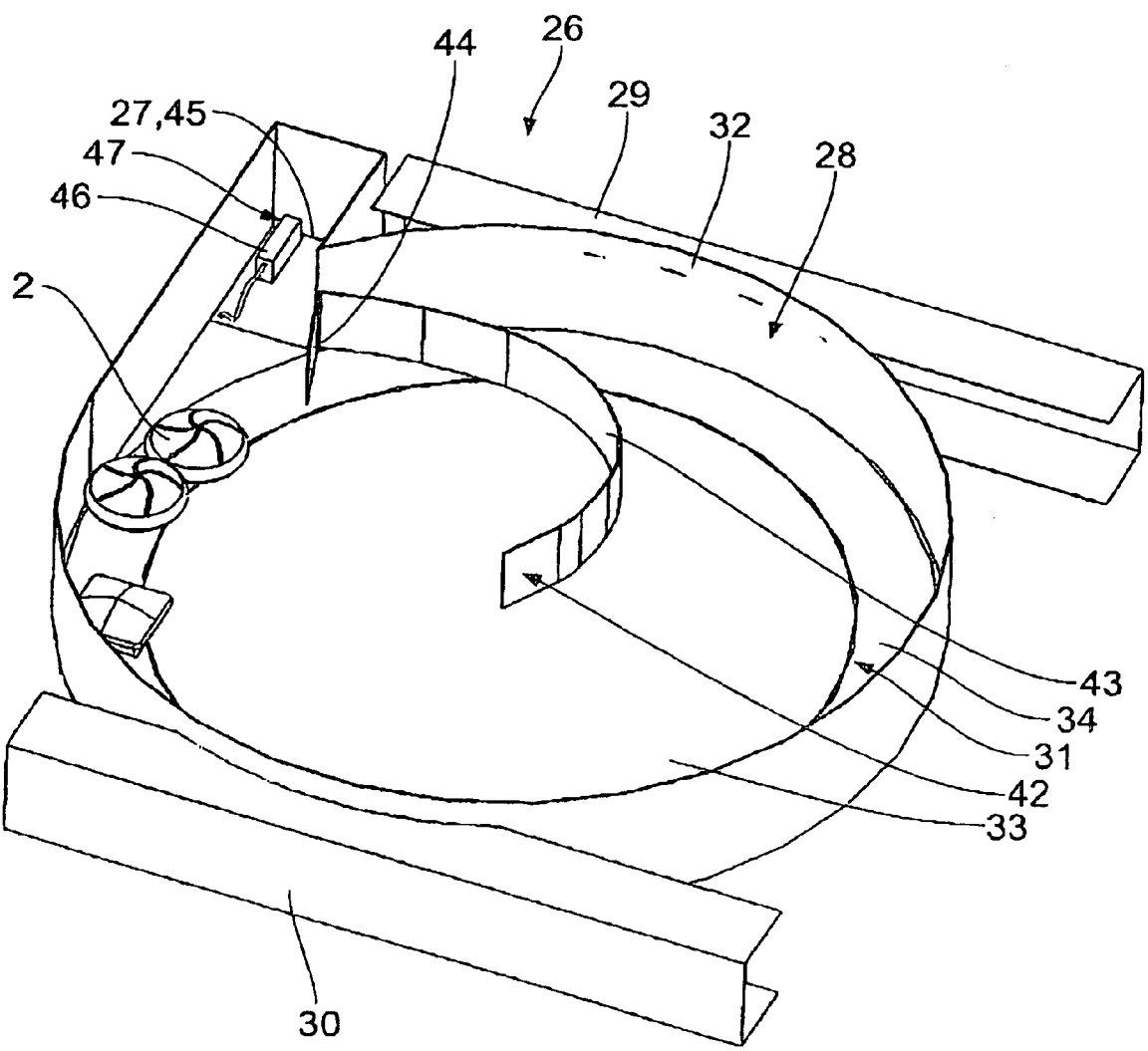
FIG. 3 is a perspective view of a separation unit of the separation device of FIGS. 1 and 2.
Figure 4:
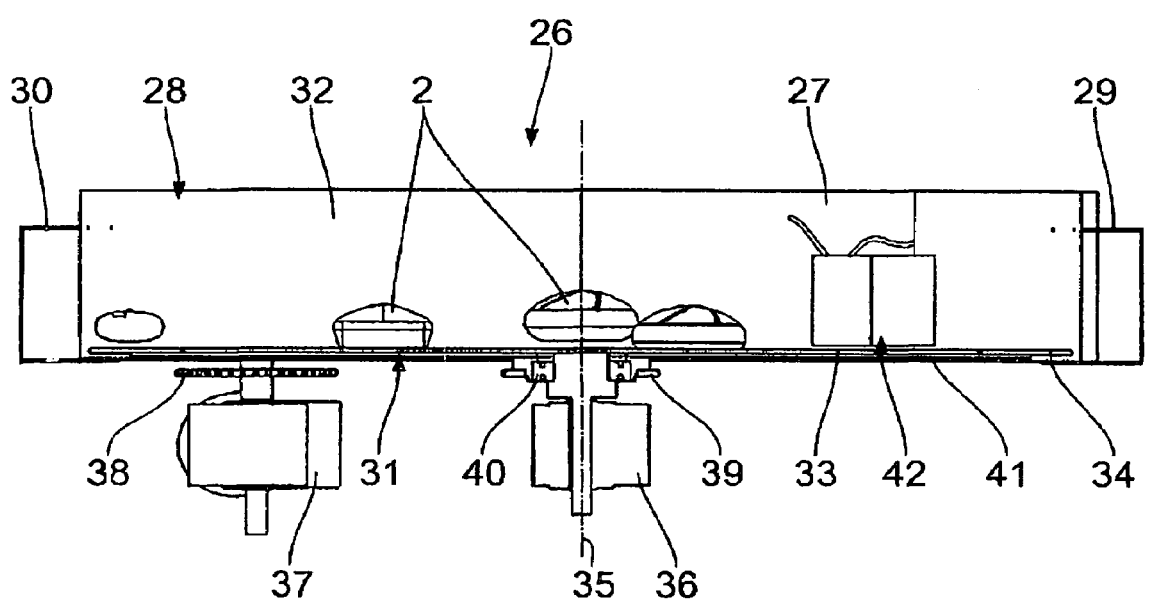
FIG. 4 is a sectional view, perpendicular to the cutting plane of FIG. 2, of the separation unit of FIG. 3.
Figure 5:
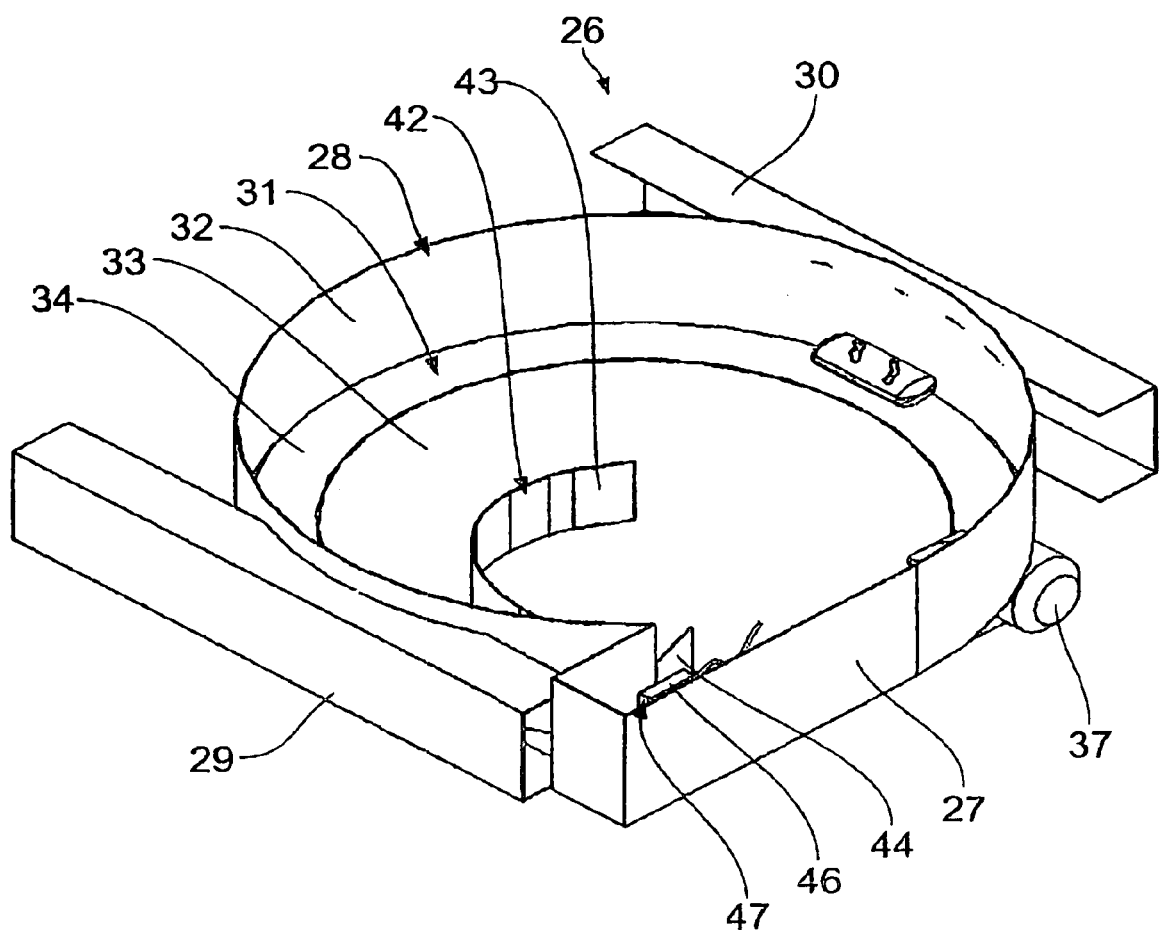
FIG. 5 is another perspective view of the separation unit of FIGS. 3 and 4.

The outlet portions 5 of the shelves 3 are closable by the aid of outlet flaps 13 which are pivotable, by way of a horizontal pivot joint 14, between a closed position in which they shut the outlet portion 5, and an open position in which discharge from the respective shelf 3 is possible. By the aid of a spring, the outlet flaps 13 are pre-loaded in the closed position. FIG. 2 illustrates the outlet flap 13 of the shelf 3 that is shown at the bottom right in the open position, and the other outlet flaps 13 in the closed position.

In prolongation of the pivot joints 14 of each outlet flap 13, an operating lever 15 is non-rotatably allocated to each of the outlet flaps 13. The total of sixteen operating levers 15 pass through opposite side walls 16, 17 of the transport carriage 8 that are parallel to the parting wall 12 so that actuation of the operating levers 15 takes place through the side walls 16, 17 and separated from the shelves 3. In a closed position, the operating levers 15 are pre-loaded by springs 18 which are held by the respective side wall 16, 17. As a result of the arrangement of the shelves 3, the operating levers 15 which pass through one of the side walls 16, 17 are provided in two groups of four one on top of the other. An entrainer 19 serves for dislocation of the operating levers 15 of one of these groups of four so that two entrainers 19 are provided for the operating levers 15 of one side wall 16, 17. The two entrainers 19 that are allocated to one side wall 16, 17 are rigidly connected with a continuous driving chain 20 which is led along two deflection pinions 21, 22 one arranged on top of the other. They are supported by the side wall 16, 17 allocated to them. The respective bottom deflection pinion 22 is driven by way of another continuous driving chain 23 and a driving pinion 24 of a driving motor 25. FIG. 1 shows the operating lever 15 of the shelf 3 on the bottom left that is turned towards a viewer in an open position and the other operating lever 15 in the closed position.

In the separation device 1, a separation unit 26 is disposed downstream of the outlet portions 5 of the shelves 3, delivering the dough pieces 2 towards an outlet portion 27. Details of the separation unit 26 are shown in FIGS. 3–7.

The separation unit 26 comprises a substantially round delivery bin 28 which is supported by two opposed, U-shaped supporting sections 29, 30 which are again fixed to the sustainers 9 of the transport carriage 8. The delivery bin 28 has a round bottom 31 and a substantially hollow cylindrical wall 32. The bottom 31 is divided into a round inner portion 33 and an annular outer portion 34 encircling the latter. The inner portion 33 and the outer portion 34 are independently drivable in the way of a turntable about a common central axis of rotation 35 which is perpendicular to the plane formed by the bottom 31. The inner portion 33 is rotatable about the axis of rotation by the aid of a driving motor 36 which is fixed underneath the bottom 31 to the supporting frame 7 of the transport carriage 8. A driving motor 37, which is also disposed underneath the bottom 31 and fixed to the supporting frame 7, serves for rotating the outer portion 34. To this end the driving motor 37 actuates a driving pinion 38 which actuates a transmission pinion 39 via a driving chain (not shown). The transmission pinion 38 is rotatable about the axis of rotation 35, mounted by way of an axial radial bearing 40 that is also fixed to the supporting frame 7. By way of extension arms 41, the transmission pinion 39 is non-rotatably joined to the outer portion 34.

A baffle plate 42 is rigidly connected to the wall 32, having a first curved baffle portion 43 and a second, straight baffle portion 44 that is short as compared to the first portion. Both baffle portions 43, 44 extend closely above the bottom 31 so that they are able to direct any dough pieces 2 disposed thereon. As seen in particular in the plan view of FIG. 6, the longer baffle portion 43, proceeding from the wall 32, extends in a bow of clockwise increasing curvature as far as to the area above the center of the inner portion 33. The short baffle portion 44 substantially covers the entire width of the outer portion 34. In the vicinity of the short baffle portion 44, the wall 32, which is otherwise closed, is interrupted, with an outlet portion 27 of the separation unit 26 being contiguous thereto. The outlet portion 27 at first continues the bottom 31 outside the outer portion 34 for a bit, then a supply outlet 45 adjoins. A sensor element 46 of a sensor 47 projects into the supply outlet 45, counting the dough pieces 4 that pass the supply outlet 45. The sensor 47 may for example be a light barrier.

The separation device 1 and the separation unit 26 is used as follows: In a charging station, all the shelves 3 of the transport carriage 8 are filled, with all the outlet flaps 13 being in the closed position. Then the transport carriage 8 is positioned in the baking system 1 in such a way that the supply outlet 45 is located above a further processing means for the bakery products 2 being not depicted, e.g. a baking apparatus or a packing apparatus for handles or bakery products 2.

Subsequently, dough pieces 4 are fed as required via the separation unit 26 from the shelves 3. To this effect, the driving motors 25, controlled by the central control unit, are triggered so that the entrainers 19 sequentially displace the operating levers 15 from the closed position into the open position, with the associated outlet flaps 13 opening and the dough pieces stored in the respective shelves 3 being transferred from the respective outlet portion 5 towards the delivery bin 28 of the separation unit 26. The respectively actuated driving motor 25 stops as soon as the outlet flap 13 is entirely open. At first, the dough pieces 4 drop predominantly on the inner portion 33 of the bottom 31 of the delivery bin 28.

Figure 6:
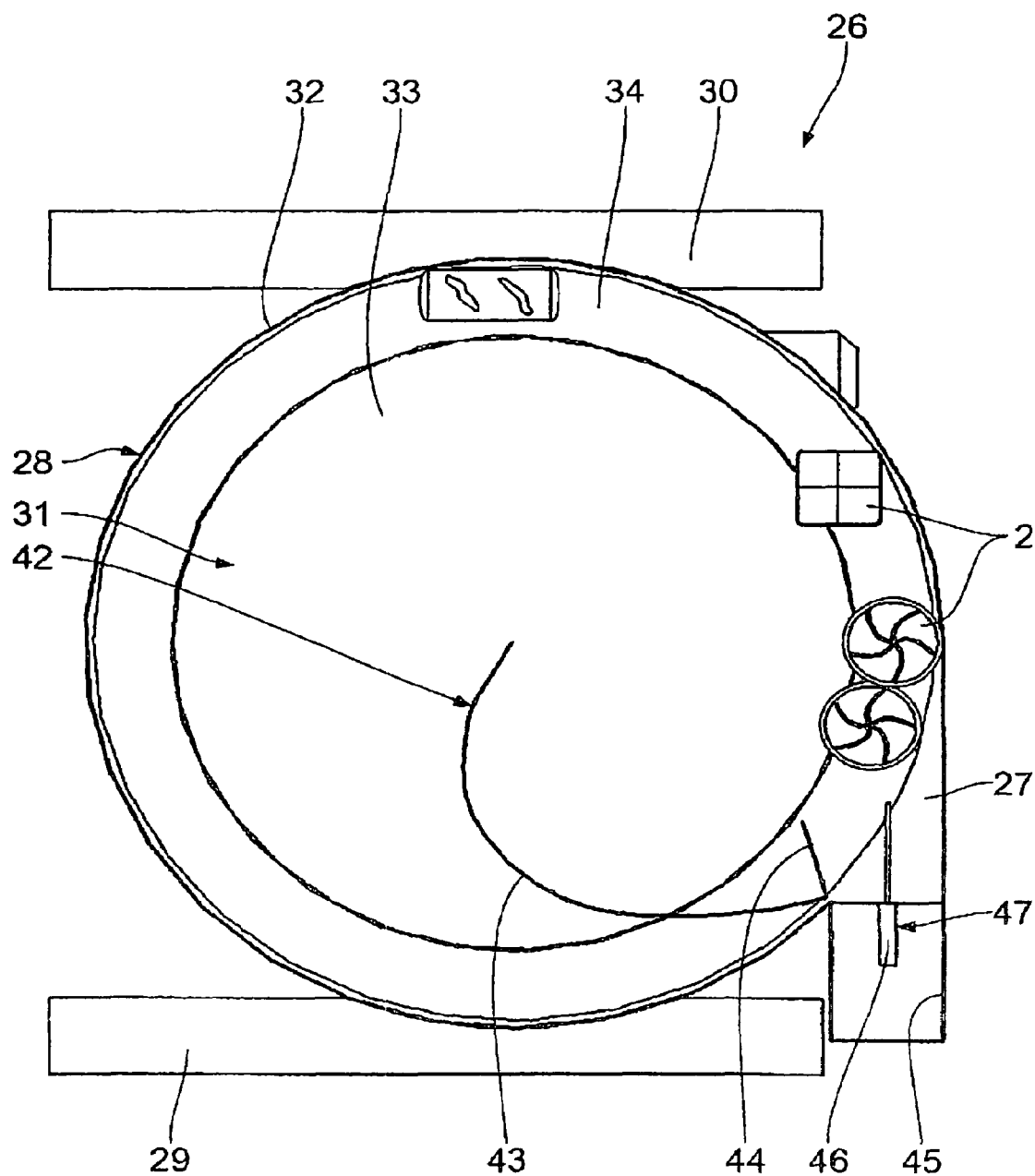
FIG. 6 is a plan view of the separation unit of FIGS. 3 to 5.
Figure 7:
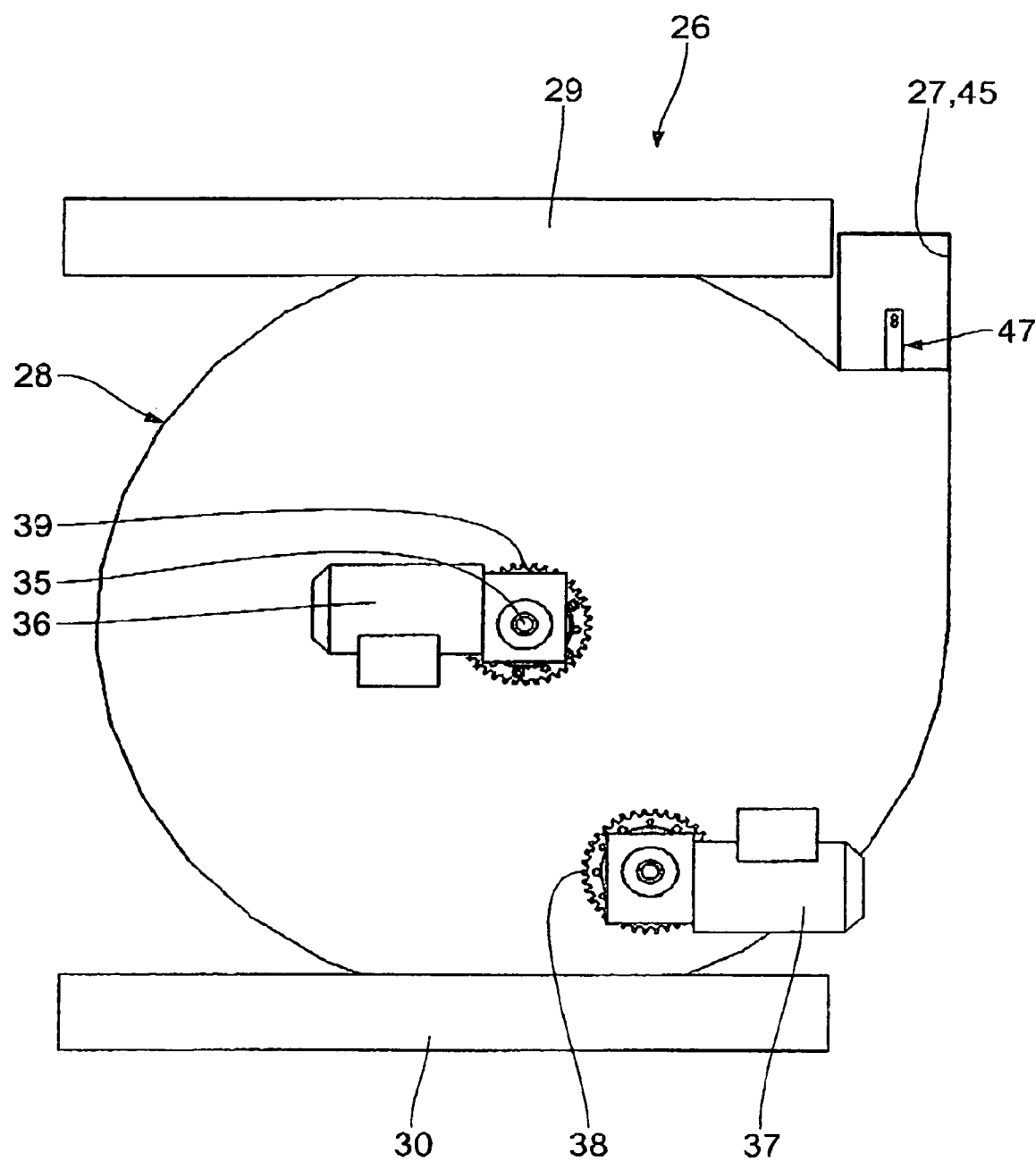
FIG. 7 is a view from below of the separation unit of FIGS. 3 to 6.
Figure 8:
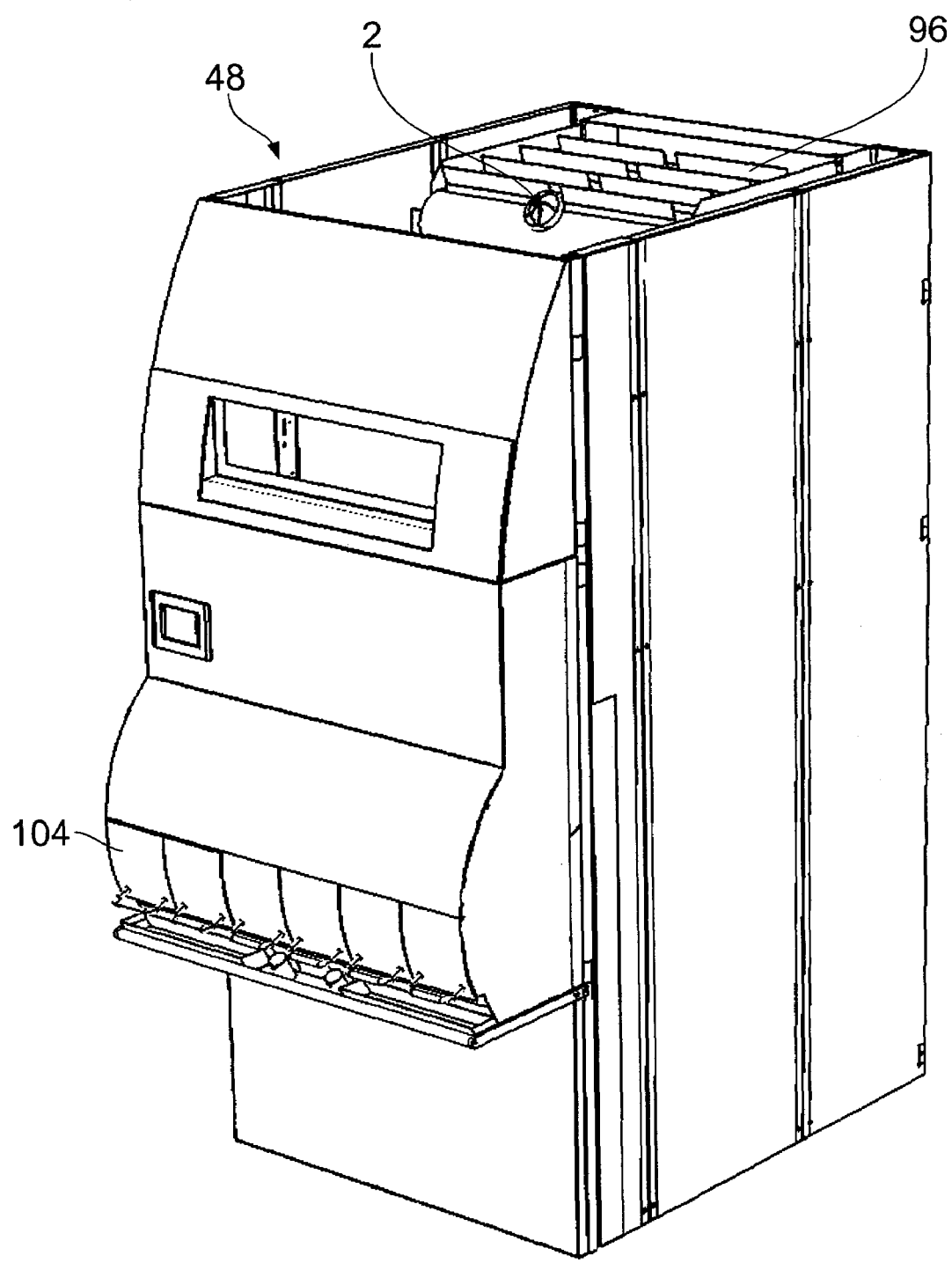
FIG. 8 is a perspective view of a baking system with a baking oven and an alternative separation device for bakery products.

Triggered by the driving motor 36, the inner portion 33 is rotated for a short time, for example for 5 seconds, counterclockwise in accordance with the plan view of FIG. 6. The baffle portion 43 of the baffle plate 42 transports the dough pieces from the inner portion 33 onto the outer portion 34, owing to the motion of the inner portion 33 relative to the baffle plate 42. Simultaneously, the outer portion 34, driven by the driving motor 37, rotates clockwise in FIG. 6 so that any dough pieces 2 on the outer portion 34 are conveyed towards the outlet portion 27, guided by the outer portion 34 of the short baffle portion 44 of the baffle plate 42. For jam of the dough pieces 4 in the delivery bin 28 in the vicinity of the baffle portion 43 to be avoided, the sense of rotation of the inner portion 33 is changed from time to time. From the outlet portion 27, the dough pieces 2 drop through the supply outlet 45 and, in doing so, is counted by the sensor 47. The sensor 47, which is connected with the central control unit, passes feedback to the control unit on the extent to which the required demand of dough pieces 2 is met. When the required number of dough pieces 2 has dropped through the supply outlet 45, the central control unit stops the driving motors 36 and 37, also stopping any further actuation of the driving motors 25 so that no further outlet flap 13 will be opened. The dough pieces that drop through the supply outlet 45 then is further processed, e.g. baked or packed.

FIGS. 8 to 15 illustrate another embodiment of a separation device 1 being part of a baking system 48. Components that correspond to those described above in connection with FIGS. 1 to 7 have the same reference numerals and will not be explained in detail again.

Figure 9:
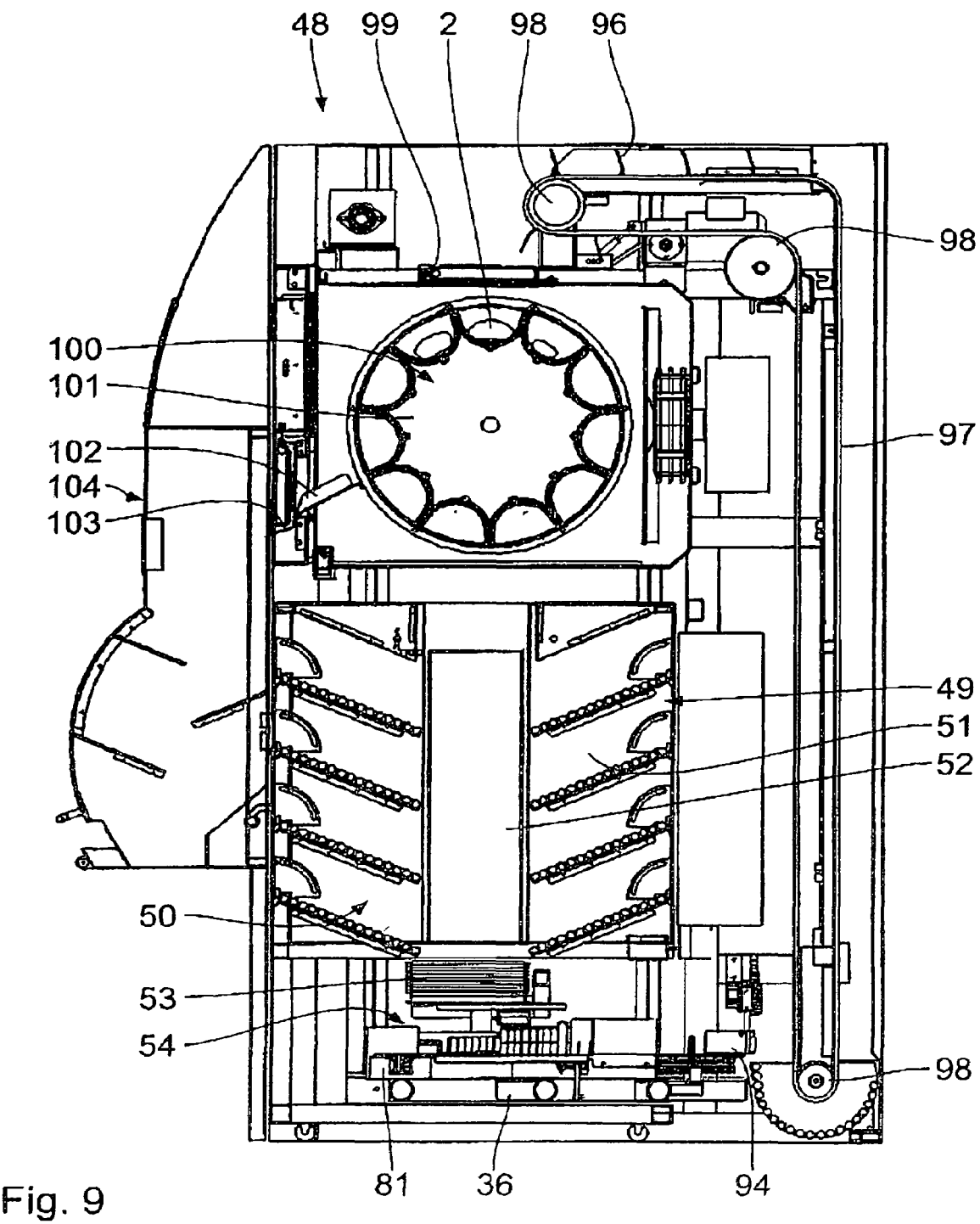
FIG. 9 is a vertical longitudinal view of the baking system according to FIG. 8.

In the baking system 48 a supply arrangement 49 for dough pieces 2 comprises two side by side movable bin supports 50, only one of which is seen in FIG. 9. The detailed construction of the bin support 50 is not of particular interest. Shelves 51 are arranged similar to the shelves 3 of the embodiment of FIGS. 1 to 7. From the shelves 51 the bakery products 2 come via a central well 52 to intermediate bin 53 of a separation device 54 of the baking system 48. The intermediate bin 53 is located underneath the well 52. In accordance to the separation device 1 of the embodiment of the FIGS. 1 to 7 the separation device 54 also works to convey the bakery products 2 from the intermediate bin 53, being a charging section of the separation device 54, to a discharge section 55, where a separation of the bakery products 2 takes place. The separation device 54 is depicted individually in FIG. 11. The intermediate bin 53 is depicted individually in the FIGS. 14 and 15.

The intermediate bin 53 which is open at the top is laterally defined by two opposite side walls 56, 57 which are mounted on a supporting frame 58. Furthermore, the intermediate bin 53 is laterally defined between the side walls 56, 57 by opposing roller paths 60 sloping towards an intermediate bin bottom 59. The intermediate bin bottom 59 is about semi-circular and pivotable around a vertical axis 61 which runs through the circle center of this semicircle. Consequently, the pivot axis is off-center relative to the area of the intermediate bin bottom 59.

For the pivot drive, a driving pinion 62 of a driving motor 63 mounted on the supporting frame 58 engages a complementary counterpart in the intermediate bin bottom 59. The instantaneous position of the intermediate bin bottom 59, i.e. its instantaneous pivot position around the pivot axis 61 is recorded by sensors 64, 65. The angle sensor 64 records here the instantaneous pivot angle of the intermediate bin bottom 59 around the pivot axis 61. Sensor 65 in the form of a light barrier records whether the intermediate bin bottom 59 is in a closed position, for instance shown in FIG. 10, in which it completely closes the intermediate bin 53 or in an outlet position deviated around axis 61 relative to the closed position. In the closed position, the light barrier of sensor 65 is not interrupted by intermediate bin bottom 59 which is, however, the case in the outlet positions.

Figure 14:
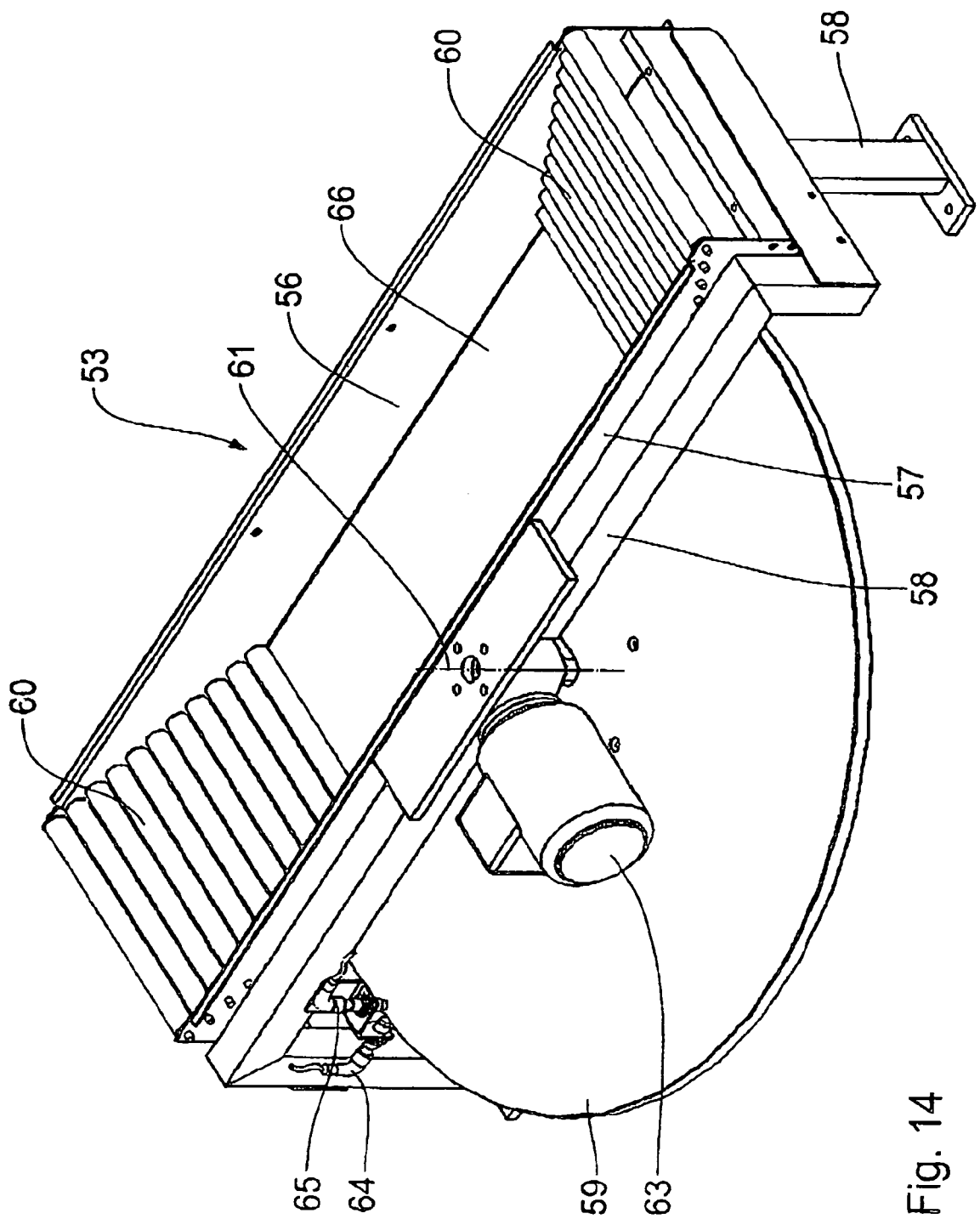
FIGS. 14 and 15 are perspective views of the intermediate bin of the separation unit of FIG. 11 in two differing positions of discharge of an intermediate bottom.
Figure 15:
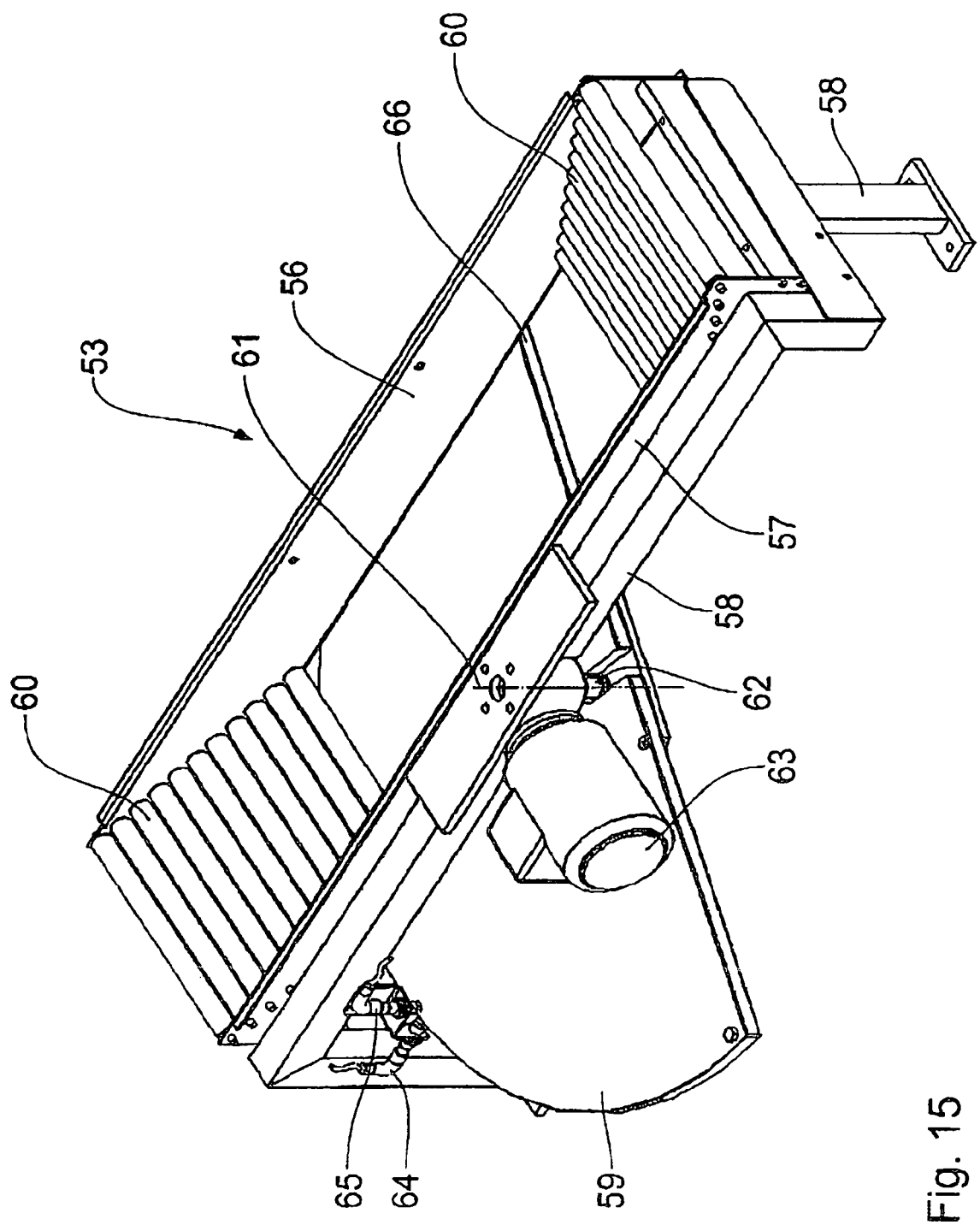

Two outlet positions of the intermediate bin bottom 59 are shown by way of example in FIG. 14 and FIG. 15. In the outlet position according to FIG. 14, the intermediate bin bottom 59 is completely pivoted by 106° out of the closed position so that intermediate bin 53 is open at the bottom. In the outlet position according to FIG. 27, the intermediate bin bottom 59 is pivoted out of the closed position by about 60° anti-clockwise around pivot axis 61 resulting in a supply outlet 66 the width of which is about one quarter of the completely opened supply outlet 66 according to FIG. 14.

Figure 11:
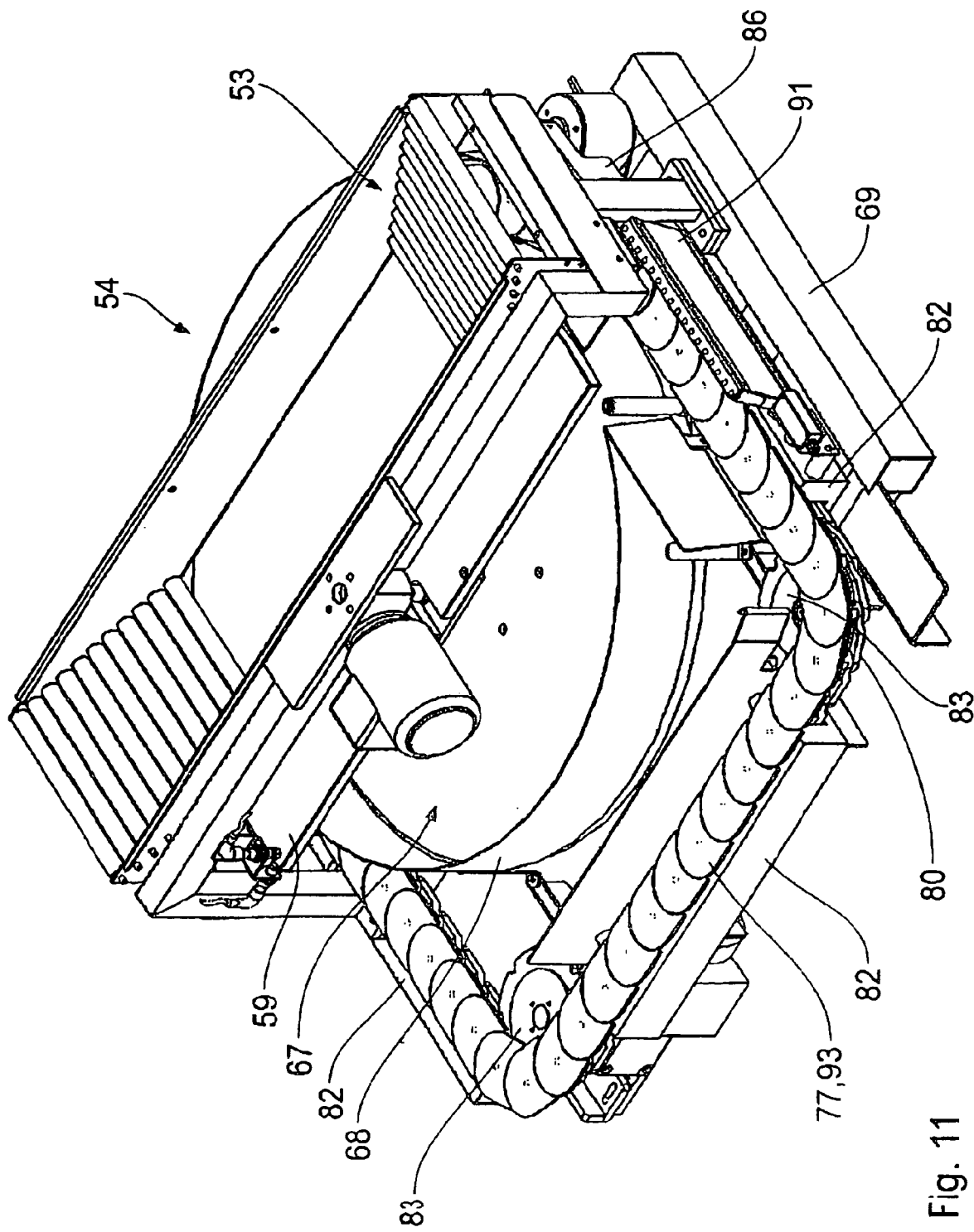
FIG. 11 another perspective view of the separation device according to FIG. 10.

Underneath the supply outlet 66 a separation unit 67 of the separation unit is provided as is shown, for example, in FIG. 11. It comprises a delivery bin 68 with a function comparable to that of the delivery bin 28 of the embodiment according to FIG. 1 to FIG. 7. Intermediate bin 53 and the delivery bin 68 are supported by supporting sections 69 which in turn are mounted on a supporting frame 70 of the baking system 48.

Figure 12:
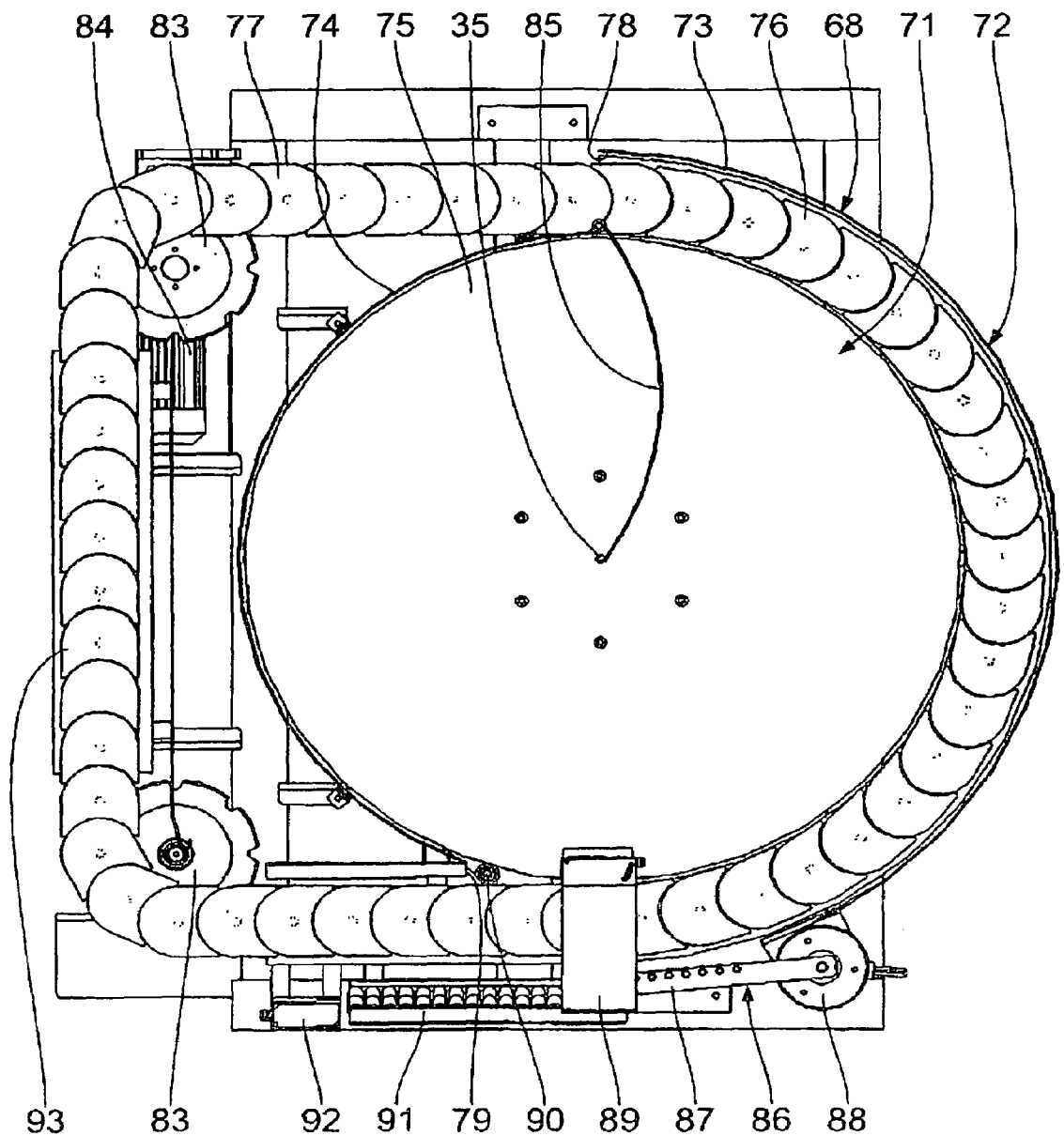
FIG. 12 is a plan view of the separation unit of FIG. 11, with an intermediate bin being omitted and a separating deflector being shown in a through position.
Figure 13:
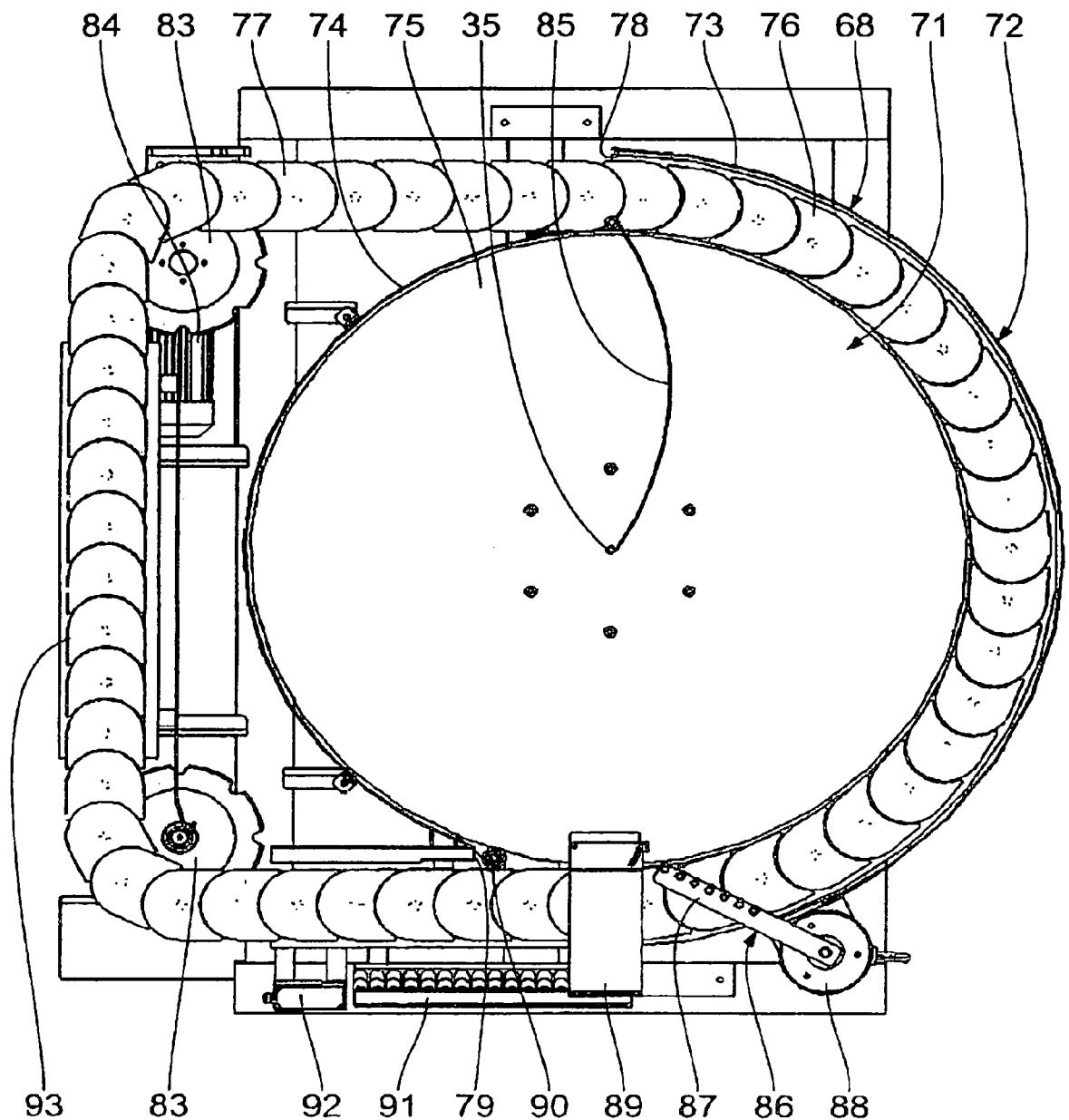
FIG. 13 is a view, similar to FIG. 12, of the separation unit with the separating deflector in a position of deflection.

Delivery bin 68 is provided with an essentially round bin bottom 71 and an essentially cylindrical bin wall 72 with a first bin wall portion 73 as shown on the right side of FIG. 12 and with a second bin wall portion 74, shown on the left side of FIG. 12, which in comparison to the first bin wall portion 73 has a smaller radius of curvature. Bin bottom 71 is provided with a round inner portion 75 of the type of the inner portion 33 of the embodiment according to FIG. 1 to FIG. 7 and a partially ring-shaped outer portion 76 externally surrounding part of the same. The latter is a conveyor belt 77 in the form of a slat conveyor which in the top view of FIG. 12 runs clockwise. Conveyor belt 77 enters the delivery bin 68 in FIG. 12 at the top through an inlet 78 defined between the bin wall portions 73, 74 and exits delivery bin 68 through an outlet 79 between the bin wall portions 73, 74 shown at the bottom of FIG. 12. The conveyor belt 77 is supported by a conveying chain 80. The latter is guided in the area of the outer portion 76 in a guiding section 81 in the form of a graduated circle (see FIG. 9). The portion of the conveyor belt 77 outside delivery bin 68, i.e. between outlet 79 and inlet 78 is guided by further guiding sections 82 and is deflected by two pinions 83 engaging conveying chain 80 with one of the pinions 83 being driven by a motor 84.

The inner portion 75 is rotatable via the driving motor 36 around the central, vertical axis of rotation 35 as is described in connection with the embodiment according to FIG. 1 to FIG. 7.

Rigidly connected to the first bin wall portion 73, a baffle plate 85 is rigidly connected in the area of inlet 78 to the second bin wall portion 73.

Relative to the delivery direction of conveyor belt 77 upstream of outlet 79, a separation deflector 86 is arranged adjoining conveyor belt 77 at its outside. The same is provided with a deflector flap 87 which can be switched by a driving unit 88 between a through position shown in FIG. 12 to a deflecting position shown in FIG. 13. In the latter position, the deflector flap 87 blocks the conveyor belt 77 in front of the outlet 79.

Relative to the delivery direction of conveyor belt 77 downstream, a separation sensor 89 formed as a light barrier is assigned to the separation deflector 86. Within the area of the outlet 79, the conveyor belt 77 is defined inwardly by a guide roller 90 and outwardly by a limiting wall portion 91 which runs parallel to the conveyor belt 77. Downstream of the limiting wall portion 91, another light barrier sensor 92 is arranged next to conveyor belt 77.

A straight portion of the conveyor belt between the two deflection pinions 83 represents an outlet hoistway 93 of conveyor belt 77, i.e. a delivery outlet portion of the same. Along this outlet hoistway 93, an outlet pusher 94 is switchably arranged and driven as a positioning unit (see FIG. 10). The switching movement of the outlet pusher 94 is guided via a guide rail 95 which is connected to the supporting frame 70 of the backing system 48. In the delivery direction of the bakery products 2 downstream of the outlet pusher 94 support droughs 96 are arranged which are connected to a continuous conveyor belt 97. The latter runs around horizontally arranged deflection rollers 98 one of which is driven.

Below the top turning point of the continuous conveyor belt 97 a charging opening 99 is arranged. Underneath the latter, a baking oven 100 is arranged. Lefthand in FIG. 9 underneath a baking drum 101 a discharge chute 102 is arranged which declines to a discharge opening 103 leading to an extraction bin 104 where finished bakery products 2 can be stored.

Figure 16:
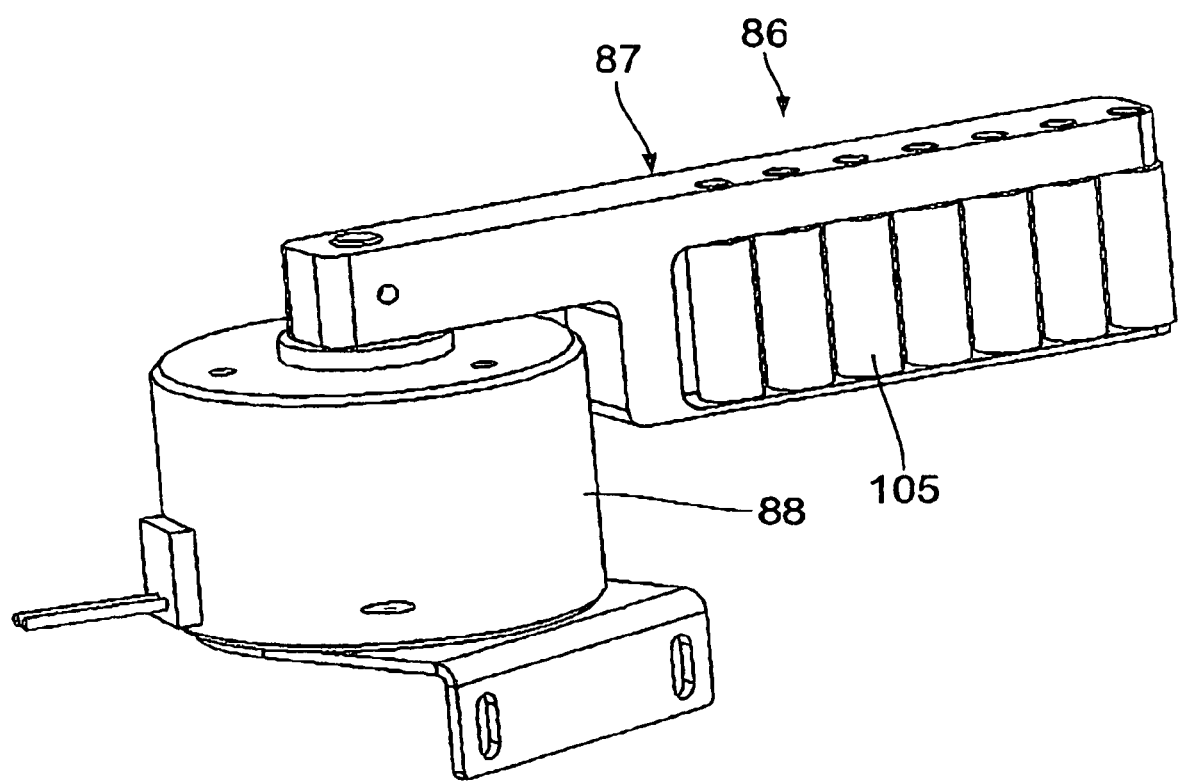
FIG. 16 is an enlarged view of a separating deflector of the separation unit of FIG. 11.

FIG. 16 shows separation deflector 86 in detail. Portions of the deflector flap 87 are formed as a roller train with a plurality of rollers 105 arranged next to each other and rotatable around a vertical axis of rotation.

Figure 17:
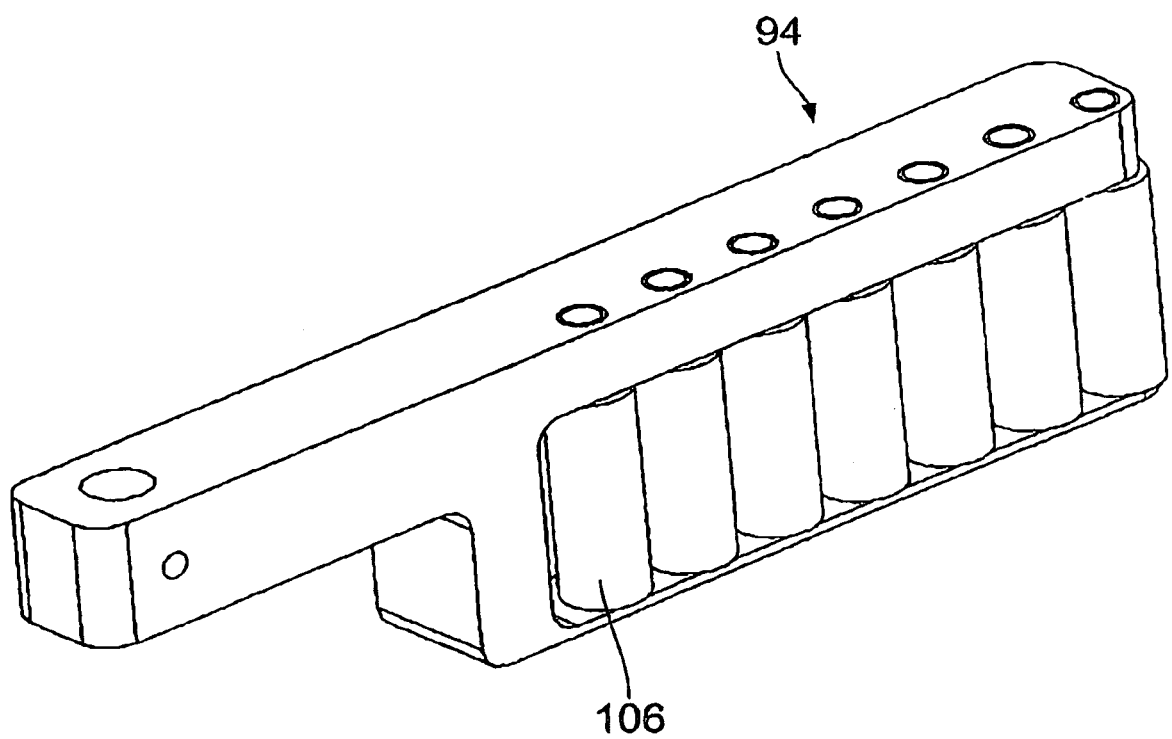
FIG. 17 is an enlarged view of a discharge slide of the separation unit of FIG. 11.

FIG. 17 shows the outlet pusher 94 in an enlarged representation. The pushing portion of it is—comparable to deflector flap 87—formed as a roller train with a plurality of rollers 106 which are arranged next to each other and are rotatable around a vertical axis of rotation.

When baking system 48 according to FIG. 8 to FIG. 15 is operated, the shelves 51 of the two bin supports 50 are filled first. When doing so, the bin supports 50 may well be arranged at a distance from the rest of the baking system 48. After filling, the two filled bin supports 50 are brought in a position which corresponds to the position in FIG. 9. Thereafter, a lot of about 60 dough pieces 2 falls controlled from the shelves 51 through the well 52 into the intermediate bin 53.

Figure 10:
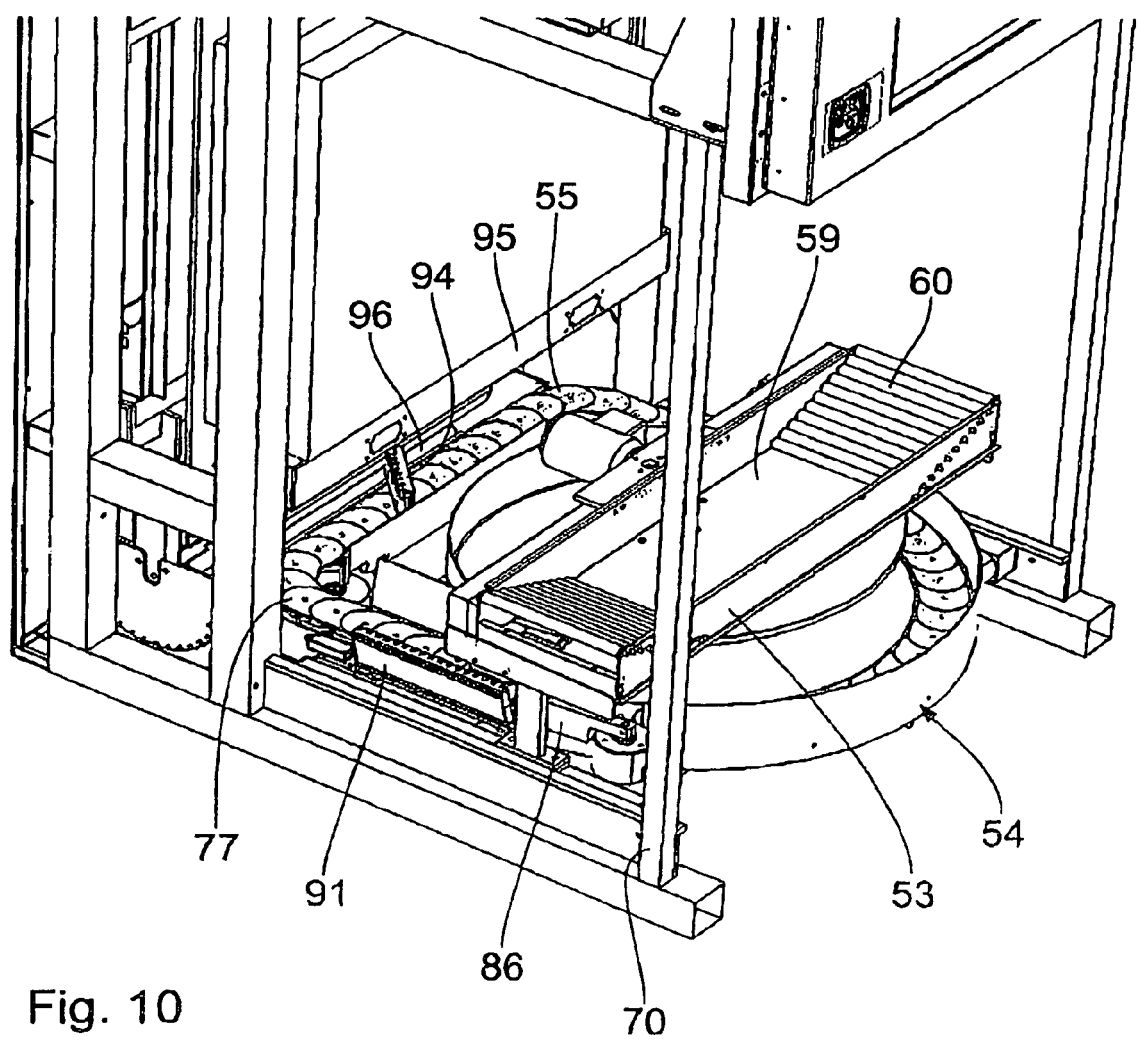
FIG. 10 a perspective sectional view of a part of the baking system according to FIGS. 8 and 9 in the region of the separation device.

When the intermediate bin 53 is filled, the intermediate bin bottom 59 is in the closed position which is shown in FIG. 10. When the intermediate bin 53 has been filled, the intermediate bin bottom 59 is brought into a first outlet position according to FIG. 15. Part of the dough pieces inside the intermediate bin 53 falls then from the intermediate bin 53 into the delivery bin 68. The outlet position is chosen in such a way that not more than 25 dough pieces fall at once into the delivery bin 68. Thereafter the dough pieces are separated by means of the separation unit 67 of the separation device 54. For this purpose, the inner portion 75 of the bin bottom 71 rotates anti-clockwise so that the dough pieces deflected by baffle plate 85 within the delivery bin 68 reach the area of inlet 78 of the conveyor belt 77. There, the dough pieces are transported by the conveyor belt 77 up to outlet 79. In order to facilitate the transfer of the dough pieces from the inner portion 75 to the conveyor belt 77 within the area of inlet 78, the level of the conveyor belt 77 in the area of inlet 78 can be somewhat lower than that of the inner portion 75. In turn, the level of conveyor belt 77 can be somewhat higher in the area of outlet 79 than that of the inner portion 75. In order to avoid a jam of the dough pieces within the area of inlet 78, the inner portion 75 rotates time and again briefly also clockwise. The inner portion 75 does, however, mainly rotate anti-clockwise.

As soon as the first dough piece on the conveyor belt 77 has passed the separation sensor 89, a respective signal sent out by the separation sensor 89 actuates the separation deflector 86. The deflector flap 87 then switches from the through position according to FIG. 12 to the deflector position according to FIG. 13 and deflects the dough pieces which follow the first dough piece from the conveyor belt 77 to the inner portion 75. When the dough piece is deflected, it rolls from the rollers 105 of the deflector flap 86. In this way, the dough piece is treated with care and a sticking of the dough pieces to the deflector flap 87 is prevented. When the level of conveyor belt 77 in the area of outlet 79 is somewhat higher than that of the inner portion 75, this deflection process is facilitated even more due to the influence of gravity. In this way, only the individual, first dough piece on the conveyor belt 77 passes outlet 79. The passage of the first dough piece 2 through outlet 79 is facilitated by guide roller 90 and the limiting wall portion 91. The guide roller 90 ensures that the dough pieces are in any case transported away from the area of outlet 79. The light barrier sensor 92 checks in the further course of conveyor belt 77 whether the separation was actually successful, i.e. whether the first dough piece has actually passed outlet 79. It is being checked here whether the light barrier sensor 92 reacts or does not react during a pre-set period of time after the switching of the separation deflector 86. When the separation was not successful, the separation deflector 86 is switched back to the through position, and the sequence which is described above which begins with the reaction of the separation sensor 89 starts again. When the separation was successful, the first dough piece is conveyed further on the conveyor belt 77 up to the outlet hoistway 93.

For the first dough piece 2, the outlet pusher 94 is in the discharge position that is farthest downstream of conveyor belt 77. The first dough piece 2 is then transferred from the outlet pusher 94 under the influence of the retainer movement by the conveyor belt 77 and under the influence of gravity up to a portion of the support trough 96. During this discharge operation through the outlet pusher 94, the separated dough piece 4 rolls down from the rollers 106 of outlet pusher 94. This ensures a careful handling of the dough piece 2 and prevents its sticking to the outlet pusher 94. During the discharge operation, the support trough 96 is shown in a charging position near the lower reversal point of conveyor belt 97. While the first dough piece 2 is transferred into the support trough 96, the separation of the following dough piece 2 can already be carried out by means of the separation deflector 86 and the sensors 89 and 92, as described above. For the discharge of the second dough piece 2 in the support trough 96, the outlet pusher 94 moves a little bit along the discharge hoistway 93 upstream so that the next separated dough piece 2 is being discharged up to a position which is adjacent to the position of the first separated dough piece upstream. This operation is now repeated until a set of dough pieces 2 is positioned on the support trough 96. A set may, for instance, consist of six or eight dough pieces 2.

As soon as such a set is complete, the continuous conveyor belt 97 is moved a little bit further until the following support trough 96 is positioned next to the discharge hoistway 93. Thereafter, a second set of dough pieces 2 is placed on the second support trough 96, as described in connection with the first, the leading support trough 96. This operation is repeated until all the ten support troughs 96 have been charged with a set of dough pieces 2. The conveyor belt 97 then is moved counterclockwise in FIG. 9 until the first, the leading support trough 96 charged with dough pieces has reached a position in the area of the uppermost reversing point for the conveyor belt 97. When the leading support trough 96 is transported further, the set of dough pieces 2 placed on the same falls through the opened charging inlet 99 into the baking oven 100. The baking drum 101 and the conveyor belt 97 then are moved synchronously such that the baking oven 100 is filled with sets of bakery products 2. Subsequently, the bakery products 2 are baked in the baking oven 100. Already during the baking process, the continuous conveyor belt 97 can be moved back until the first support trough 96 is located once again next to the delivery hoistway 93 so that already during the baking process a new separation sequence, as described above, can take place.

When the baking process is completed, the baked dough pieces 2 fall through discharge opening 103 into the extraction bin 104 and is ready for extraction.

The temporal and positional control as regards to the individual components of the separation device 54, in particular the choice of the point in time for the adjustment of a given discharge position of the intermediate bin bottom 59, the choice of the respective discharge position, the choice of the points in time to reverse the rotational movement of the inner portion 75, the control and surveillance of the sensors 89, 92, of the separation deflector 86 and of the outlet pusher 94 are made by a central control unit which is not depicted. This central control unit works according to the explanation given above in connection with the separation device according to FIGS. 1 to 7.

What is claimed is:

1. A separation device (1; 54) for dough pieces (2) for conveying a predetermined number of dough pieces in a controlled, sequential manner provided with
    an inlet portion (4; 53) for delivering a plurality of dough pieces (2),
    a separation unit (26; 67) for separating the dough pieces (2) delivered,
    an outlet portion (27; 93) for individually discharging the dough pieces (2) separated from one another, wherein the separation unit (26; 67) comprises:
    a container (28; 68) having a container bottom (31; 71) which is divided into a round inner portion (33; 75) to which the dough pieces (2) are delivered and an outer portion (34; 76), extending at least partially around the inner portion (33),
    wherein the outer portion (34; 76) can be caused to rotate relative to the inner portion (33; 75) around an axis of rotation (35) extending perpendicular to the container bottom plane and is arranged in conveying connection with the outlet portion (27; 93).

2. A separation device according to claim 1, wherein the inner portion (33; 75) can be caused to rotate around the axis of rotation (35) independently of the outer portion (34; 76).

3. A separation device according to claim 1, wherein the container (28; 68) comprises a rigid baffle plate (42; 85) which is formed such that dough pieces (2) which are initially positioned on the inner portion (33; 75) are deflected towards the outer portion (34; 76) due to the baffle plate (42; 85) moving relative to the inner portion (33; 75).

4. A separation device according to claim 1, wherein the inner portion (33; 75) can be caused to rotate around the axis of rotation (35) in alternating senses of rotation.

5. A separation device according to claim 1, having a sensor (47; 89, 92) for counting the dough pieces (2) separated from one another.

6. A separation device according to claim 1, wherein the inlet portion (53) is formed by an intermediate bin which is designed such that a partial amount of dough pieces (2) is discharged to the downstream components of the separating device.

7. A separation device according to claim 6, wherein the intermediate bin (53) comprises an outlet (66) whose width is adjustable.

8. A separation device according to claim 7, wherein the intermediate bin (53) comprises an intermediate bin bottom (59) which is movable around an eccentric axis (61) between at least an open position and a closed position and whose position determines the width of the outlet (66).

9. A separation device according to claim 1, wherein the separation unit (26; 67) comprises an outer portion (76) which is designed as a conveyor slat belt (77).

10. A separation device according to claim 1, having a separation deflector (86) which interacts with at least one separation sensor (89) and, responding to a signal from the separation sensor (89), transports dough pieces (2) following a first dough piece (2) conveyed on the outer portion (76) from the outer portion (76) back to the inner portion (75).

11. A separation device according to claim 10, having another sensor (92) which is arranged downstream of the separation deflector (86) in the direction of conveyance of the outer portion (76) and serves to detect dough pieces (2) which are conveyed on at least one of the group of the outer portion (76) and the outlet portion arranged downstream of the separation deflector (86).

12. A separation device according to claim 10, wherein the outlet portion (93) comprises a discharge slide (94) which is allocated to an outlet and conveying compartment (93) of the outer portion (76) arranged downstream of the separation deflector (86) and which discharges dough pieces (2) perpendicular to the direction of conveyance of the outlet and conveying compartment (93).

13. A separation device according to claim 1, having at least one deflecting element (90, 91) for deflecting dough pieces towards the outer portion (76).

14. A separation device according to claim 1, having at least one deflecting element (90, 91) for deflecting dough pieces towards the outer portion (76) for deflecting dough pieces away from the outer portion (76).

15. A separation device according to claim 13, wherein the deflecting element (90, 91) is a roller which is rotatable around a vertical axis.

16. A separation device according to claim 1, wherein the outer portion (34) of the container bottom (31) of the container (28) of the separation unit (26) is annular.

* * * * *